United States Patent [19]

Grassl et al.

[11] Patent Number: 5,533,703
[45] Date of Patent: Jul. 9, 1996

[54] SPRUNG VEHICLE SEAT

[75] Inventors: Johann Grassl, Pittersberg; Dietmar Herbert, Amberg, both of Germany

[73] Assignee: Grammer AG, Amberg, Germany

[21] Appl. No.: 322,220

[22] Filed: Oct. 13, 1994

[30] Foreign Application Priority Data

Oct. 13, 1993 [DE] Germany .................. 43 35 199.9

[51] Int. Cl.$^6$ .................................................. F16M 13/00
[52] U.S. Cl. ........................... 248/550; 248/421; 248/422
[58] Field of Search .................................. 248/550, 157, 248/421, 422, 423, 370; 297/344.15, 344.16; 267/64.28, 34, 221, 223; 108/136

[56] References Cited

U.S. PATENT DOCUMENTS

| | | | |
|---|---|---|---|
| 3,951,373 | 4/1976 | Swenson et al. | 248/550 |
| 4,714,227 | 12/1987 | Holm et al. | 248/550 X |
| 4,729,539 | 3/1988 | Nagata | 297/344.15 X |
| 4,817,220 | 4/1989 | Guttormsem | 248/421 X |
| 4,822,094 | 4/1989 | Oldfather et al. | 297/344.16 X |
| 4,834,333 | 5/1989 | Saito et al. | 248/422 X |
| 4,946,145 | 8/1990 | Kurabe | 297/344.16 X |
| 5,007,611 | 4/1991 | Kanai | 248/422 |
| 5,176,355 | 1/1993 | Carter | 297/344.16 X |
| 5,364,060 | 11/1994 | Donovan et al. | 248/421 X |
| 5,366,196 | 11/1994 | Mitschelen et al. | 248/550 X |

FOREIGN PATENT DOCUMENTS

| | | |
|---|---|---|
| 2753105A1 | 6/1979 | Germany . |
| 3219371A1 | 11/1983 | Germany . |
| 3517503C2 | 3/1987 | Germany . |

*Primary Examiner*—Korie Chan
*Attorney, Agent, or Firm*—Elliot M. Olstein; Raymond J. Lillie

[57] ABSTRACT

A sprung vehicle seat comprises a scissor support assembly formed by scissor members pivotable about a common pivot axis, and a gas spring for adjustment of the support assembly. A first valve device can be connected to the gas spring for adjustment of the height of the seat and a second valve device can be connected to the gas spring by way of a coupling for adjusting the height of the seat in dependence on weight. The coupling comprises a segment member which is pivotable about the support assembly pivot axis and which has an arcuate toothed portion, and a pivot arm with a tooth arrangement which can be brought into meshing engagement with the toothed portion. The pivot arm is connected to one of the scissor members of the support assembly and is actuable by a drive means connected to the first valve device. Also arranged pivotably at the support assembly pivot axis is a rocker member operable to actuate the second valve device and movable limitedly relative to the segment member.

9 Claims, 4 Drawing Sheets

SPRUNG VEHICLE SEAT

BACKGROUND OF THE INVENTION

One form of sprung vehicle seat comprises a scissor-type support assembly having scissor members which are pivotable about a common scissor support assembly axis, and a gas spring for adjusting the scissor support assembly. A first valve device is connected to the gas spring for height adjustment of the vehicle seat, while a second valve device can be connected to the gas spring by way of a coupling for adjustment of the height of the vehicle seat in dependence on weight. A sprung vehicle seat of that kind of design configuration is to be found for example in DE 35 17 503 C2. For establishing the respective seat height, that is to say for the purposes of height adjustment of the seat, that seat has a belt winding device which can be connected to a cam shaft by way of a coupling arrangement. The coupling arrangement has a gear which is axially displaceable between two face gear members, wherein one of the annular tooth configurations of the face gear members is connected to the belt winding device. It will be seen that such a configuration not only has a large number of individual components, the manufacture of which represents a certain level of expenditure, but in addition all those components also require a not inconsiderable amount of space.

SUMMARY OF THE INVENTION

An object of the present invention is to provide a sprung vehicle seat which is of a comparatively simple design configuration.

Another object of the present invention is to provide a sprung vehicle seat in which the individual components for establishing the respective height setting of the seat are of a simple structure and require only a small amount of space on the seat.

Still another object of the present invention is to provide a sprung vehicle seat which affords a good springing action, ready adjustability and reliability of operation while being of a simplified structure.

In accordance with the principles of the present invention, the foregoing and other objects are achieved by a sprung vehicle seat having a scissor-type support assembly having first and second scissor members pivotable about a common scissor assembly axis. A gas spring is provided for adjusting the scissor support assembly, a first valve means being connected to the gas spring for height adjustment of the seat. A second valve means can be connected to the gas spring by way of a coupling for adjustment of the height of the vehicle seat in dependence on weight. The coupling comprises a segment member which is pivotable about said scissor assembly axis and which has an arcuate tooth portion thereon, and a pivot arm having a tooth configuration thereon which is adapted to be brought into meshing engagement with the tooth portion on the segment member. The pivot arm is pivotably connected to one of said scissor assembly members and is actuable by a drive means operatively connected to the first valve means. Pivotably arranged at the scissor assembly axis is a rocker-type cam member for actuation of the second valve means, said member being movable limitedly by limiting members relative to the segment member. A first spring means is disposed between the segment member and the rocker-type cam member.

As will be seen in greater detail hereinafter therefore, the coupling configuration in accordance with the present invention does not require two face gears and a further gear disposed movably therebetween, but only a segment member with its arcuate tooth portion and a pivot arm with a tooth configuration thereon, wherein the tooth configuration on the pivot arm can be actuated, that is to say brought into a condition of engagement, by the drive means operatively connected to the first valve means. During height adjustment of the sprung vehicle seat according to the invention the coupling of the seat arrangement is also in the open condition, that is to say the tooth portion on the pivot arm is not in meshing engagement with the arcuate tooth portion on the segment member. The meshing engagement between the pivot arm and the segment member occurs only when suitable height adjustment of the seat has been effected and terminated. During such height adjustment of the seat the operative connection between the rocker member and the second valve means is thus interrupted. As soon as suitable height adjustment of the seat has been effected, the pivot arm is automatically operatively connected to the segment member by operation of the drive means, and that is effected by meshing engagement of the tooth configuration on the pivot arm with the arcuate tooth portion of the segment element, and at the same time an operative connection is made between the rocker member and the second valve means such that adjustment of the height of the vehicle seat takes place in dependence on the weight of the occupant of the seat. In accordance with the invention therefore the support assembly of the seat only requires a pivot arm, a segment member and a rocker member, which for example can be in the form of sheet metal components and accordingly require only a small amount of space. A further advantage of the structure according to the invention is that the stated elements are very simple to produce and the wear that they suffer is negligibly slight, even after a prolonged period of time, so that in that respect the sprung vehicle seat according to the invention enjoys an excellent service life.

In accordance with a preferred feature of the sprung seat according to the invention the pivot arm is arranged pivotably on a shift plate member fixed to the corresponding scissor assembly member. The shift plate member may be of dimensions in terms of surface area which scarcely differ from the corresponding dimensions of the segment member and the rocker member, so that the arrangement also requires only a small amount of space in regard to the shift plate member. The shift plate member is fixed to the associated scissor assembly member for example by screwing or riveting. The pivot axis about which the pivot arm is mounted pivotably to the shift plate member is disposed at least substantially parallel to the scissor assembly axis.

In accordance with another preferred feature of the invention, disposed between the shift plate member and the pivot arm are a piston-cylinder unit forming the drive means for the pivot arm, and a second spring means. The piston-cylinder unit and the second spring means may be arranged in such a way that suitable actuation of the piston, by virtue of the first valve means which produces height adjustment of the vehicle seat, results in mechanical stressing of the second spring means. As soon as a suitable adjustment in respect of height of the vehicle seat has been effected, that is to say, as soon as the first valve means is no longer actuated, the piston of the piston-cylinder unit can be moved back into its initial position by relief of the stress in the second spring means.

In accordance with a further preferred feature of the invention which affords a compact configuration with a saving in space, the rocker member and the segment member are arranged facing from the scissor assembly axis in at least approximately the same direction, and each have a fixing means such as a fixing projection for the first spring means. In that arrangement the fixing means or projections are desirably readily accessible from the exterior so that if necessary it is a simple operation, which does not involve a great deal of time, for a worn or damaged first spring means to be replaced by a new unused spring means. The first spring means is usually disposed at least approximately parallel to the piston-cylinder unit forming the drive means.

To provide a compact configuration it is also desirable for the fixing projection which projects from the segment member to extend through an arcuate slot in the rocker member, the fixing projection and the first and second end portions of the arcuate slot forming the above-mentioned limiting members. The center of the arcuate slot is at the scissor assembly axis. Provided on the rocker member is a second fixing projection which, jointly with the fixing projection that projects from the segment member, serves to fix the first spring means in position. The first spring means, like also the second spring means which is desirably arranged at least substantially parallel to the piston-cylinder unit constituting the drive means, may be a coil tension spring.

The second valve means may comprise first and second valve members which are operatively associated with the rocker member and which are disposed on the second scissor assembly member. Such an arrangement affords the advantage that the relative movement between the rocker member and the valve members upon movement of the vehicle seat in respect of height is relatively great, thus affording a high degree of accuracy in terms of actuation of the valve members. A degree of accuracy which is only half as great can be achieved if the two valve members are arranged not on the second scissor assembly member but on a stationary part of the seat, such as for example a base plate. Such an arrangement does not use both the movement of the rocker member connected to the first scissor assembly member by way of the coupling and also the corresponding movement of the second scissor assembly member, but it only utilizes the movement of the rocker member, that is to say that of the first scissor assembly member of the scissor support assembly. Under some circumstances however that reduced level of accuracy may be sufficient.

Further objects, features and advantages of the invention will be apparent from the following description of a preferred embodiment.

DESCRIPTION OF THE PREFERRED EMBODIMENT

Figure 1:
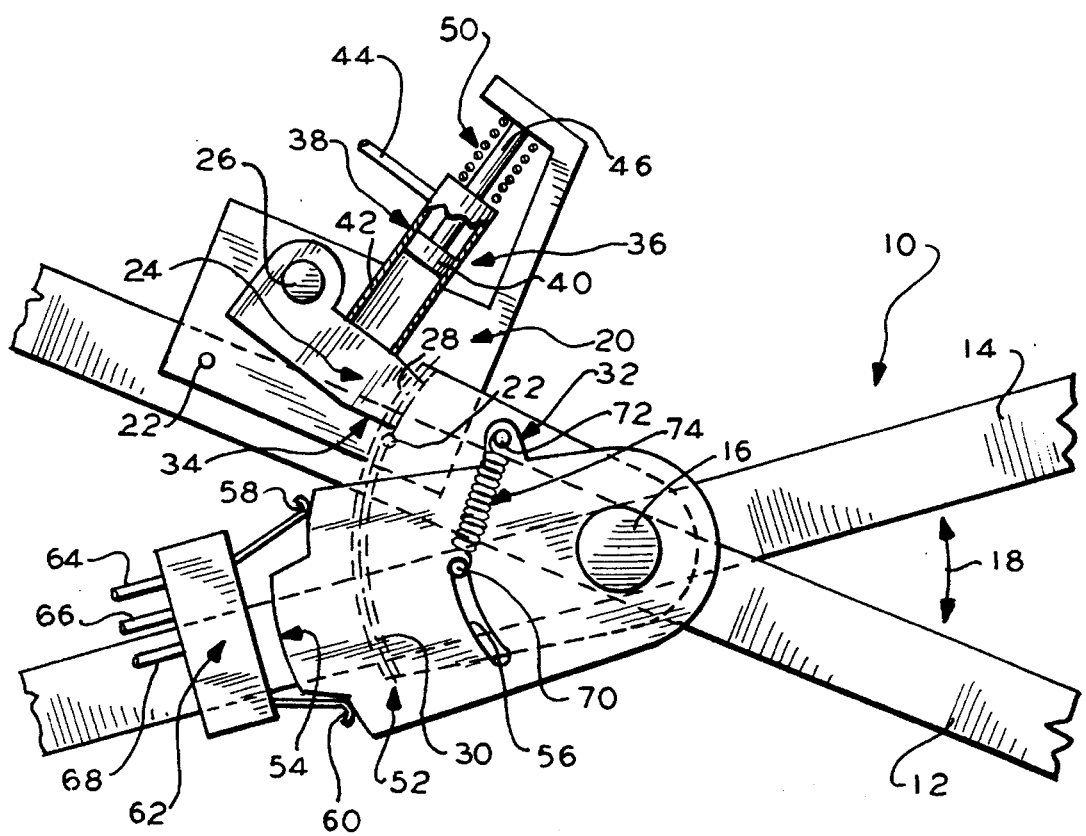
FIG. 1 is a diagrammatic side view of the major parts of the sprung vehicle seat, with only portions of the scissor support assembly

Reference will now be made to the drawing showing an embodiment of the major parts of the sprung vehicle seat according to the invention and more specifically FIG. 1 illustrating a scissor support assembly 10 of a sprung vehicle seat, comprising a first scissor assembly member in the general form of a lever as indicated at 12 and a second scissor assembly member also in the form of a lever as indicated at 14. The members 12 and 14 are pivotably connected together by means of a common scissor assembly axis 16. That pivotability of the assembly is indicated by the arcuate arrow 18 in FIG. 1.

A shift plate member 20 is fixed to the first scissor member 12 by suitable means such as for example screws or rivets as indicated at 22. A pivot arm 24 is in turn pivotably mounted on the shift plate member 20. The pivot arm 24 is pivotably mounted by means of a connecting axis member as diagrammatically indicated at 26. The pivot arm 24 is provided with a tooth configuration 28 which can be brought into or out of engagement with an arcuate tooth portion 30 on a segment member 32. The pivot arm 24 and the segment member 32 thus form parts of a coupling arrangement which is generally identified by reference numeral 34 and which is actuable by means of a drive device 36. The coupling arrangement 34 is shown only in highly diagrammatic form in FIG. 1 insofar as it is self-evident that, upon actuation of the drive means 36, the teeth of the tooth configuration 28 and the tooth portion 30 respectively are not to be sheared off. The drive means 36 comprises for example a piston-cylinder unit as indicated at 38 comprising a piston 40 displaceable in a cylinder 42. Connected to the cylinder 42 is a conduit 44 which is described in greater detail hereinafter with reference to FIG. 4. The piston 40 of the piston-cylinder unit 38 is fixed to the shift plate member 20 by means of an associated piston rod 46. A spring member 50 is operatively disposed between the shift plate member 20 and the piston-cylinder unit 36, and the mode of operation thereof will also be described hereinafter with reference to FIG. 4.

The arcuate tooth portion 30 of the segment member 32 is disposed concentrically to the axis 16. A rocker member 52 is mounted pivotably at the axis 16 laterally beside the segment member 32 and has a switching or control portion 54 at the end thereof remote from the pivot mounting axis 16, and an arcuate slot 56 intermediate the portion 54 and the axis 16. The portion 54 is sensed by first and second valve members 58 and 60 which are also described in greater detail hereinafter with reference to FIG. 4. The valve members 58 and 60 are parts of a valve device 62 which is communicated with three conduits 64, 66 and 68 of which only portions are indicated in FIG. 1. The conduits 64, 66 and 68 are also described in greater detail hereinafter with reference to FIG. 4.

The segment member 32 is provided with a fixing projection 70 which extends through the arcuate slot 56 in the member 52. The member 52 is provided with a second fixing projection 72, as can also be clearly seen from FIGS. 2 and 5. A spring member 74 is operatively disposed between the fixing projection 70 and the fixing projection 72, being in the form of a coil tension spring.

Figure 2:
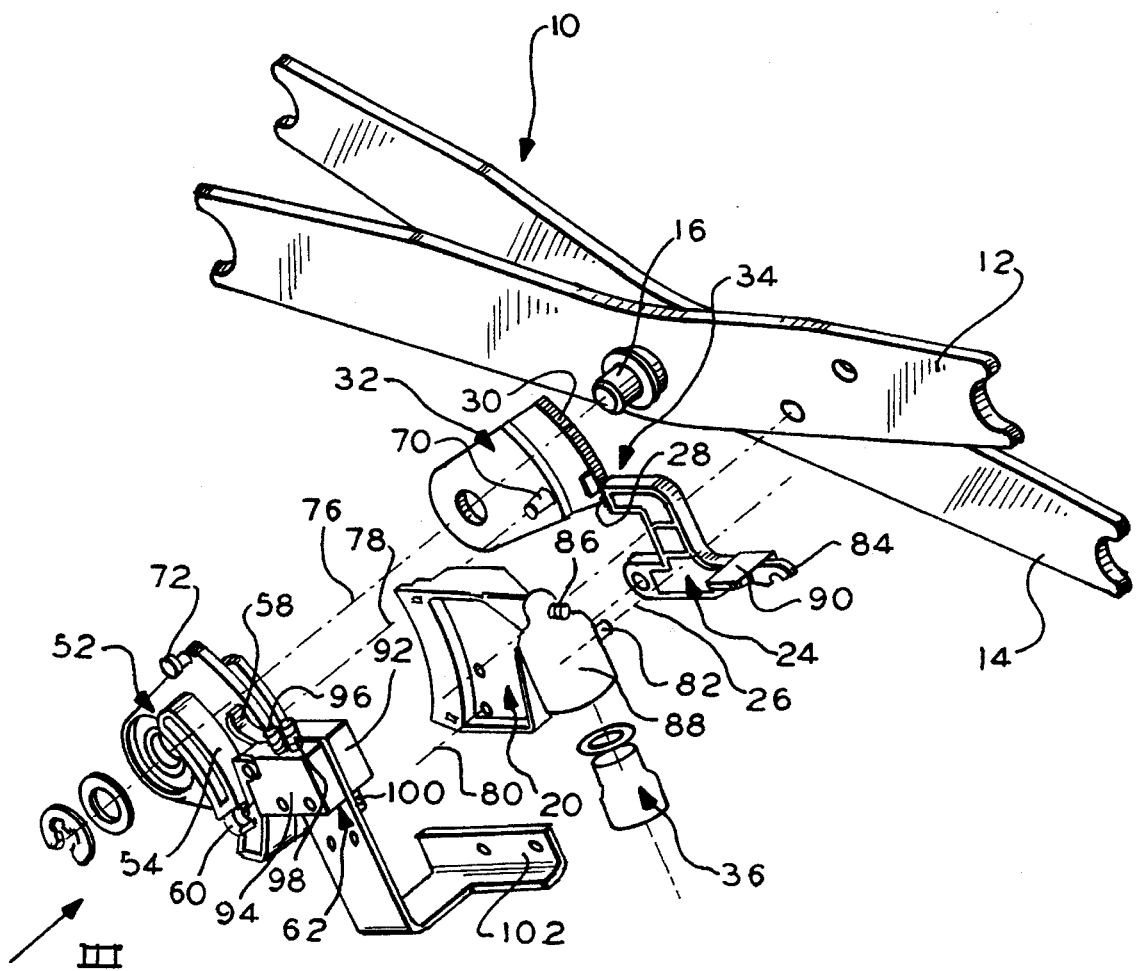
FIG. 2 is a perspective exploded view of the components shown in FIG. 1.

Reference will now be made to FIG. 2 showing part of the scissor support assembly 10 with the pivot axis 16 about which the first and second scissor assembly members 12 and 14 are pivotable. The segment member 32 and the rocker member 52 are mounted pivotably at the axis 16, as is indicated by the dash-dotted line 76. The segment member 32 is provided with the arcuate tooth portion 30 and with the fixing projection 70. The fixing projection 70 extends through the arcuate slot which is indicated at 56 in FIG. 1 but which is not visible in FIG. 2, in the member 52. The way in which the fixing projection 70 extends through the slot 56 is indicated in FIG. 2 by the dash-dotted line 78.

The pivot arm 24 can be brought into meshing engagement by means of its tooth configuration 28, with the arcuate tooth portion 30 on the segment member 32. The pivot arm 24 is mounted pivotably on the plate member 20, as indicated by the dash-dotted line 80. The plate member 20 is provided for the arrangement of the piston-cylinder unit 38 of the drive means 36, and has a fixing projection 82. A further fixing projection 84 is provided on the pivot arm 24. Disposed between the fixing projection 82 on the plate member 20 and the fixing projection 84 on the pivot arm 24 is the spring member which is indicated at 50 in FIG. 1 but which is not shown in FIG. 2.

The piston-cylinder unit 38 of the drive means 36 has a connecting nipple 86 for the conduit indicated at 44 in FIG. 1. The piston-cylinder unit 38 can be disposed between a cap portion 88 provided on the plate member 20 and a support portion 90 in the vicinity of the fixing projection 84 on the pivot arm 24.

The rocker member 52 with the control or switching portion 54 thereof is sensed by the first and second valve members 58 and 60 which are operatively associated with valves 92 and 94 of the second valve device 62. Reference numerals 96, 98 and 100 denote connecting nipples, which are associated with the respective valves 92 and 94, for the conduits indicated at 64, 66 and 68 in FIG. 1 and FIG. 4. The second valve device 62 is fixed to the second scissor assembly member 14 by means of a bracket 102 in order to be able to determine a very accurate angular positioning of the two members 12 and 14 of the scissor support assembly 10 relative to each other and consequently very accurate determination of the respective position in respect of height of the corresponding sprung vehicle seat.

Figure 3:
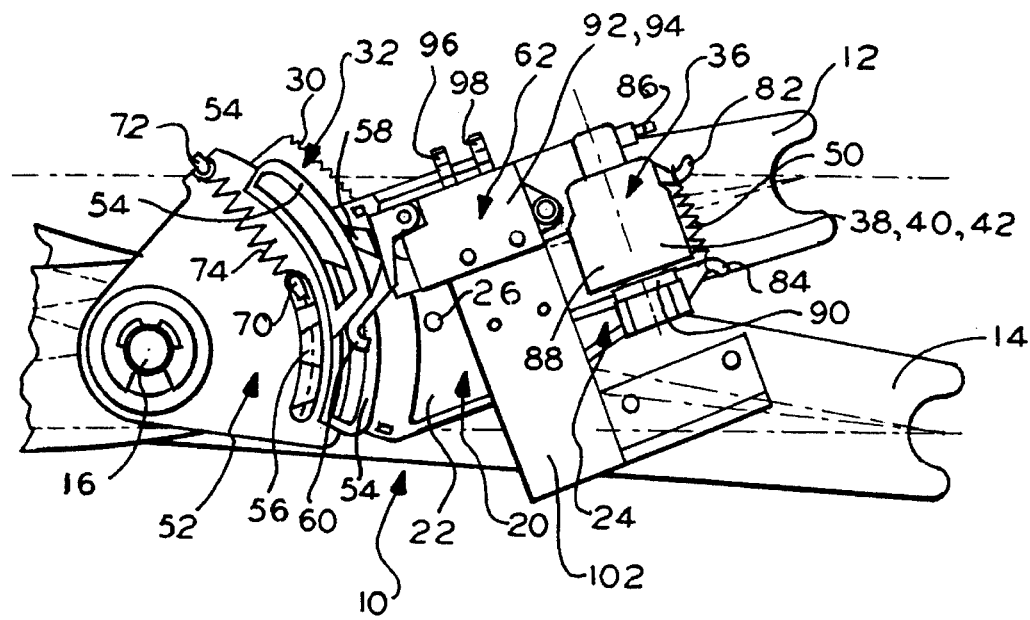
FIG. 3 is a side view of the components shown in FIG. 2, viewing in the direction indicated by the arrow III therein.

Reference is now made to FIG. 3 showing a side view of a part of the scissor support assembly 10 with the first and second scissor assembly members 12 and 14 in the position in which they are pivoted together to the maximum degree, in order to make it clear that the structure according to the invention for the member 52, the plate member 20, the segment member 32 and the pivot arm 24 as well as for the drive means 36 and the second valve device 62 requires only a very small amount of space.

The same parts and details are identified in FIG. 3 by the same references as those used in FIGS. 1 and 2 so that there is no need for all those details and parts to be fully described once again with reference to FIG. 3.

Figure 4:
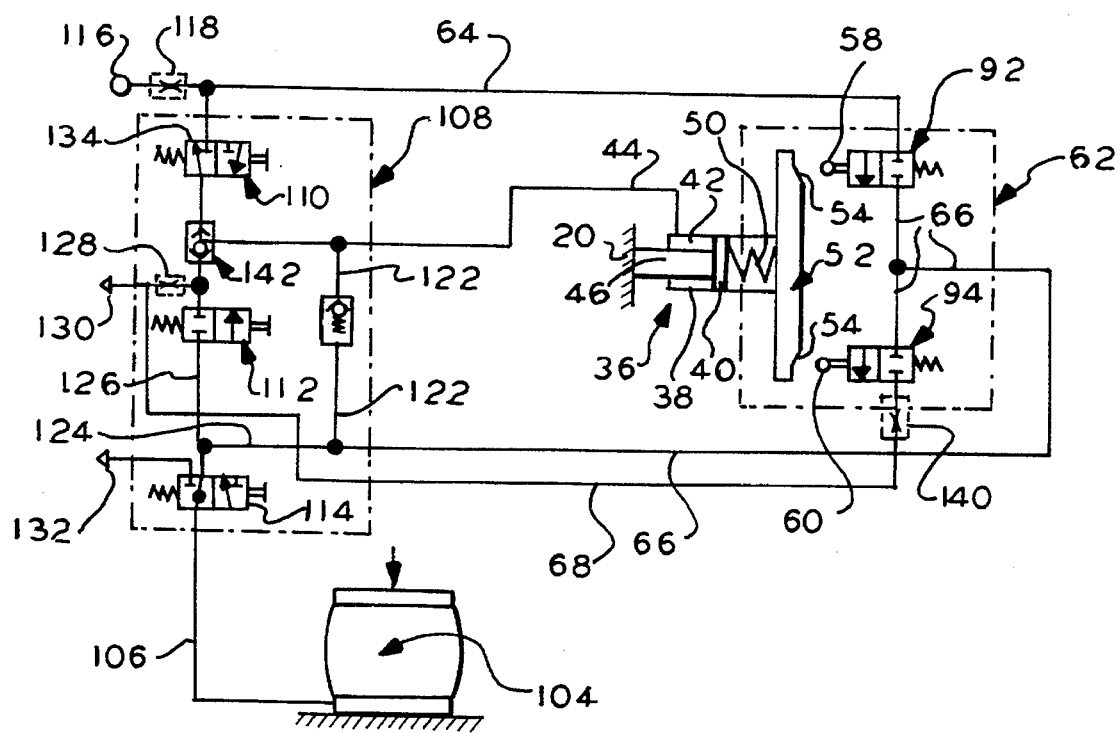
FIG. 4 shows a block circuit diagram of the first and second valve devices for actuation of the gas spring and the rocker member with the associated drive means.

FIG. 4 is a block circuit diagram of the structure according to the invention, including a gas spring 104 of a sprung vehicle seat, which is adapted to co-operate in the usual manner with the scissor support assembly to provide the support and springing action for the seat. The gas spring 104 is connected by means of a conduit 106 to a first valve device 108 which has a valve 110 for raising the seat, a valve 112 for lowering the seat and a valve 114 for unthrottled fast lowering of the seat.

If for example the valve 110 is actuated, that is to say it is moved towards the left from the rest position shown in FIG. 4, compressed air can flow out of a compressed air source diagrammatically indicated at 116 through a throttle device 118 and through the valve 110 into the conduit 44 from which a conduit 122 branches off. Compressed air therefore flows through the conduit 122 into a further conduit 124 and from same through the valve 114 into the gas spring 104. The gas spring 104 therefore causes a sprung vehicle seat (not shown) to be raised. At the same time compressed air flows through the conduit 44 into the drive device 36, that is to say, into the cylinder 42 of the piston-cylinder unit 38 shown for example in FIG. 1. When that happens, as a result of the piston 40 of the piston-cylinder unit 38 being stationarily mounted, the piston 42 of the piston-cylinder unit 38 is moved towards the left in FIG. 4. In consequence, the rocker member 52 with its control portion 54 is moved away from the associated valve members 58 and 60 and at the same time the second spring member 50 is mechanically stressed. The valve members 58 and 60 belong to valves 92 and 94 of the second valve device which is generally indicated at 62.

Therefore, as long as the valve 110 for raising the vehicle seat is actuated, the second valve device 62 is in its inactive position for that period of time.

If the sprung vehicle seat is to be lowered, then instead of the valve 110, the valve 112 of the first valve device 108 is actuated so that compressed air can flow out of the gas spring 104 through the conduit 106 and through the valve 114 to the conduit 126 and from same through the valve 112 which has been actuated, that is to say displaced towards the left in FIG. 4, to a throttle 128 and through the throttle 128 into the ambient atmosphere as indicated at 130. When that happens, at the same time the OR-valve 142 disposed between the valves 110 and 112 is switched over from the position shown in FIG. 4 so that the communication with the valve 110 is shut off and a communication is made through the conduit 44 with the drive means 36. The cylinder 42 is therefore subjected to pressure from the gas spring 104 and correspondingly actuated, as already described above in connection with actuation of the valve 110, so that decoupling of the rocker member 52 and the valve members 58 and 60 takes place.

For the purposes of fast downward movement of the vehicle seat, the valve 114 of the first valve device 108 is actuated, that is to say it is displaced towards the left in FIG. 4, so that compressed air can flow out of the gas spring 104 through the conduit 106 and through the valve 114 directly and without any throttle effect into the ambient atmosphere as indicated at 132. At the same time the communication with the conduit 124 is interrupted by means of the valve 114, so that the conduit 124 is thus closed off.

When a desired height of the seat has been set, the valves 110, 112 and 114 of the first valve device 108 are in the rest position shown in FIG. 4, so that compressed air which has previously flowed into the cylinder 42 of the piston-cylinder unit 38 of the drive means 36 can flow out into the ambient atmosphere as indicated at 134 through the conduit 44 and through the valve 110 of the first valve device 108. That means that the second spring member 50 of the drive means 36 can be mechanically relieved of stress again, whereby an operative connection is made between the member 52 and the valve members 58 and 60 of the valves 92 and 94 of the second valve device 62. If now a heavyweight user of the seat (not shown) sits on the seat, the valve member 58 comes into operative relationship with the control portion 54 of the member 52 so that the valve 92 is operated by being displaced towards the right in FIG. 4. That means that from the compressed air source 116 by way of the throttle 118 the conduit 64 is communicated by means of the valve 92 with the conduit 66 which is itself communicated with the conduit 124. The conduit 124 is communicated by way of the valve 114 of the first valve device 108 with the conduit 106 which communicates with the gas spring 104 so that compressed air from the compressed air source 116, throttled by the throttle 118, flows into the gas spring 104 whereby the downward movement of the vehicle seat, which is caused by the weight of the seat occupant, is compensated again, that is to say, the vehicle seat is appropriately raised in dependence on the weight of the occupant of the seat.

When the occupant of the seat stands up and thus leaves the sprung seat, a suitable positive operative relationship occurs between the valve member 60 of the valve 94 of the second valve device 62 and the control portion 54 of the rocker member 52 whereby the valve 94 is operated by being displaced towards the right in FIG. 4. As a result, a fluid communication is made between the gas spring 104 and the conduit 106 connected thereto, through the valve 114 of the first valve device 108, through the conduit 124, through the conduit 66 and through the valve 94, with the conduit 68 in which a throttle 140 is disposed. The conduit 68 is communicated with the ambient atmosphere at 130 so that compressed air can escape from the gas spring 104, in a throttled condition, into the ambient atmosphere, which means that the seat is suitably lowered in accordance with removal of the load applied thereto by the person previously occupying the seat. On the other hand, as indicated above, the seat is raised in order to compensate for the weight of a person occupying the seat.

Figure 5:
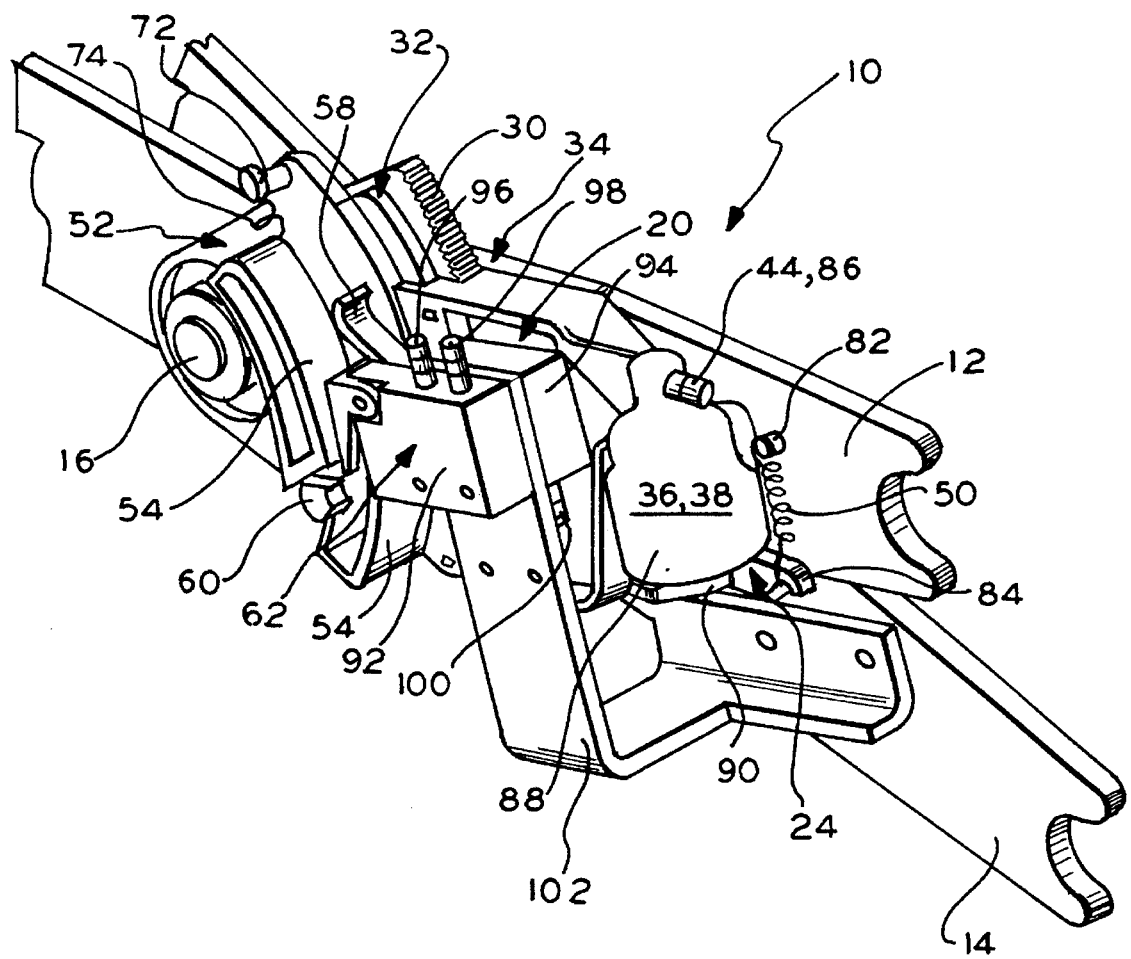
FIG. 5 is a perspective view of the parts shown in FIG. 3 in a side view.

FIG. 5 is a view similar to that shown in FIG. 3 which serves to illustrate the compact structure of the seat according to the invention, the same parts and details being identified in FIG. 5 by the same references as those used in FIG. 3 so that there is once again no need for all such parts and details to be fully described at this point in connection with FIG. 5.

It will be appreciated that the above-described embodiment of the invention has been set forth solely by way of example and illustration of the principles of the invention and that various modifications and alterations may be made therein without thereby departing from the spirit and scope of the invention.

What is claimed is:

1. A sprung vehicle seat comprising: a scissor support assembly having first and second scissor members pivotable about a common pivot axis, a gas spring for adjusting the support assembly, a first valve means connected to the gas spring for height adjustment of the seat, a second valve means connected to the gas spring for adjustment of the height of the seat in dependence on weight, a coupling for providing the connection of the second valve means to the second scissor member, the coupling having a segment member which is pivotable about said pivot axis and which has an arcuate tooth portion, and a pivot arm with a tooth configuration adapted to be brought into meshing engagement with said tooth portion, means pivotably connecting the pivot arm to the first scissor member, a drive means connected to the first valve means and operable to actuate the pivot arm, a rocker member pivotably arranged at said pivot axis movable relative to the segment member for actuation of the second valve means, a limiting means for limiting movement of the rocker member relative to the segment member, and a first spring means operatively disposed between the segment member and the rocker member.

2. The seat as set forth in claim 1 including a shift plate member fixed to the first scissor member, wherein the pivot arm is arranged pivotably on said plate member.

3. The seat as set forth in claim 2 wherein the drive means includes a piston-cylinder unit for actuating the pivot arm, and including a second spring means operatively disposed between said plate member and the pivot arm.

4. The seat as set forth in claim 1 wherein the rocker member and the segment member are arranged facing from the support assembly pivot axis in at least approximately the same direction and each have a fixing means for mounting of the first spring means.

5. The seat as set forth in claim 4 wherein the fixing means on the segment member is a projection which projects from the segment member, wherein the rocker member has an arcuate slot into which the projection on the segment member extends, the slot having first and second end portions co-operable with said projection to form the limiting means.

6. The seat as set forth in claim 1 wherein the second valve means has first and second valve members operatively associated with the rocker member and arranged on the second scissor member.

7. A support arrangement for a seat, comprising first and second lever means each having first and second ends and disposed in mutually crossing relationship, pivot axis means pivotably interconnecting the first and second lever means intermediate their ends, thereby to form a scissor support assembly, a gas spring for supportive springing of the support assembly, a first valve means and means communicating the first valve means with the gas spring, operable for adjusting the gas spring for height adjustment of the support arrangement, a second valve means and means communicating the second valve means with the gas spring, operable for adjusting the gas spring for adjustment of the height of the support arrangement responsive to seat occupant weight, coupling means operatively disposed in the communication between the second valve means and the gas spring, the coupling means including a segment member which is pivotable about said pivot axis and which has an arcuate tooth portion, and a pivot arm with a tooth configuration adapted to be brought into meshing engagement with said tooth portion, means pivotably connecting the pivot arm to the first lever means, a drive means connected to the first valve means and operable to actuate the pivot arm, an actuating member pivotably arranged at said pivot axis movable relative to the segment member for actuation of the second valve means, a limiting means for limiting movement of the actuating member relative to the segment member, and a first spring means operatively disposed between the segment member and the actuating member.

8. The support arrangement as set forth in claim 7 wherein the drive means is a piston-cylinder means.

9. The support arrangement as set forth in claim 7 and including a second spring means urging the pivot arm towards a rest position.

\* \* \* \* \*